E. A. LAUGHLIN.
SIDE BEARING FOR RAILWAY CARS.
APPLICATION FILED AUG. 9, 1909.
1,000,926.
Patented Aug. 15, 1911.
2 SHEETS—SHEET 1.
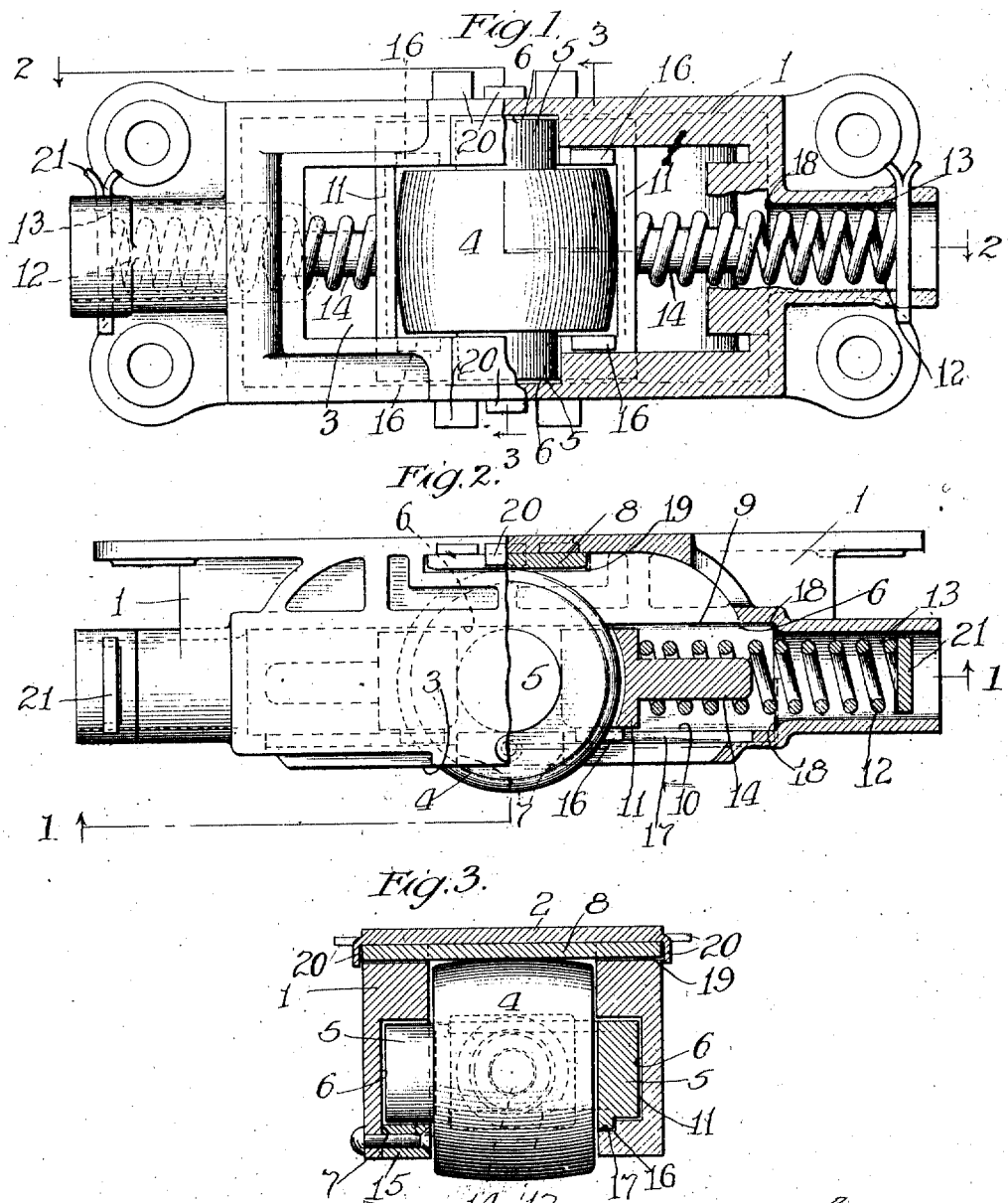

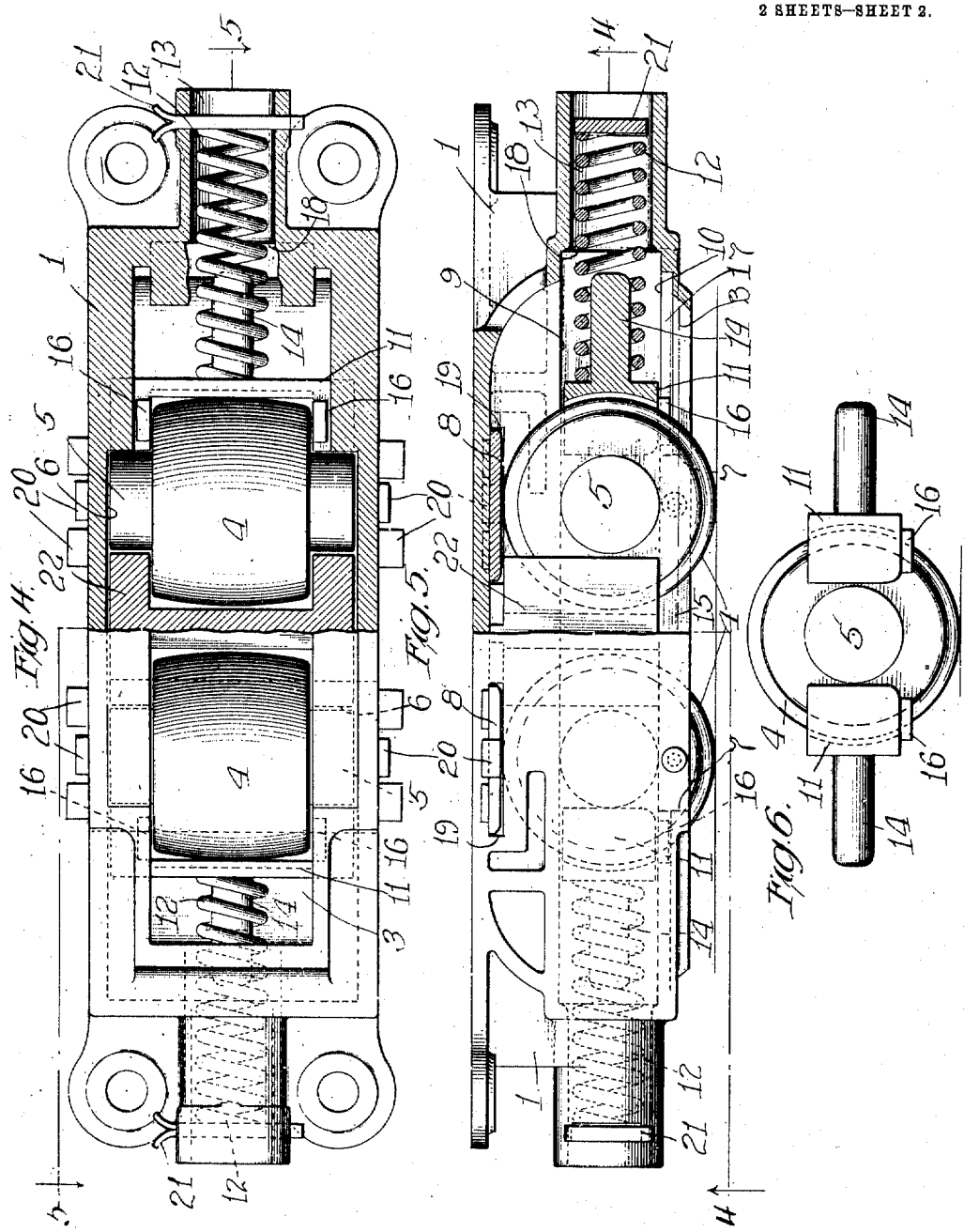

UNITED STATES PATENT OFFICE.

ELMYR A. LAUGHLIN, OF CHICAGO, ILLINOIS.

SIDE BEARING FOR RAILWAY-CARS.

1,000,926.  Specification of Letters Patent.  Patented Aug. 15, 1911.

Application filed August 9, 1909. Serial No. 511,921.

*To all whom it may concern:*

Be it known that I, ELMYR A. LAUGHLIN, a citizen of the United States of America, and a resident of Chicago, Cook county, State of Illinois, have invented certain new and useful Improvements in Side Bearings for Railway-Cars, of which the following is a specification.

The main objects of this invention are to provide an improved construction for side bearings for railway cars, particularly in that type of side bearings in which one or more rollers traveling in a runway transmit the load from the body of the car to the truck bolsters; to provide an improved construction for side bearings whereby the antifriction rollers will be so mounted that they will at all times be free to rotate through the relative movements of the car body and truck bolster when the car is passing around a curve; and to provide an improved construction for the supporting frame or casing of the side bearing adapted to prevent excessive frictional resistance to the rotation of the rollers at the ends of the runways and thereby avoid the flattening of the rollers which occurs in side bearings of ordinary construction; to provide improved means for insuring the centering of the antifriction rollers at times when the load is for an instant removed from the rollers; and to provide an improved construction in the frame which will permit of easy assembling of the parts, and permit of removing or replacing the springs and wearing parts without removing the bearing from the car. These objects are accomplished by the construction shown in the accompanying drawings, in which:

Figure 1 illustrates a specific construction showing the invention applied to a side bearing with a single antifriction roller. Fig. 2 is a section on the line 2—2 of Fig. 1. Fig. 3 is a section on the line 3—3 of Fig. 1. Fig. 4 is a view corresponding to Fig. 1, and illustrates the manner in which the invention is carried out in side bearings in which there are more than a single roller, this view being partly in section and taken on the line 4—4 of Fig. 5. Fig. 5 is a section on the line 5—5 of Fig. 4. Fig. 6 is a detail showing the relation of the centering followers with respect to the stop which prevents either of them from passing the middle position.

In the construction shown, the supporting frame of the side bearing is in the form of a hollow casing comprising a body part or frame 1 closed at the top and having an opening 3 in the bottom, through which the antifriction roller or rollers 4 protrude. The cavity within the body 1 and the opening 3 are of considerably greater length than the diameter of the roller 4 or the sum of the diameters, if there are more than one, to form a runway in which the rollers work.

The roller 4 is provided with trunnions 5 of considerably less diameter than the body of the roller, and the side walls of the frame are provided with guideways 6 within which the trunnions operate, and at one part of the casing which is intermediate between the limits of the travel of the roller 4 in the runway, the side walls have vertical channels 7 extending upward into the guideways 6, to permit the roller 4 to be passed into place.

The wear-plate 8 is mounted in the frame in position to bear upon the top of the roller 4. When the roller 4 is adjacent to its middle or normal position, the wear-plate 8 bears upon the top of the periphery of the roller and supports the load. The wear-plate is, however, of such length that when the roller is at either limit of its travel in the runway it will have passed clear of the wear-plate 8, and the load will be borne by the upper surfaces 9 of the guideways 6. These surfaces 9 are so located that they will have contact with the trunnions 5 only at times when the roller 4 is at or near one of the limits of its movement. The lower surface 10 of the guideways is so located as to engage the trunnions 5 and support the roller when, through swaying of the car body, the frame is lifted above its normal position with respect to the wheel truck of the car.

A pair of followers 11 are slidably mounted in the runways 6 and located at respectively opposite sides of the roller. These are so shaped as to extend into engagement with the trunnions 5 without having contact with the periphery of the roller. Springs 12 bear on the followers 11 and normally urge the roller 4 to its middle position. The springs 12 are secured against displacement by sockets 13 in the ends of the frame and projections 14 on the followers. In order to prevent either of the followers 11 from passing the middle point in the range of travel of the roller 4, stops are provided, which are preferably in the form of blocks 15 located between the sides of the passages 7 so that their tops will be substantially flush with surfaces 10. Each follower is provided with a depending lug 16 which extends into a groove 17 in the bottom of each guideway and abuts against the stop 15 to prevent its passing the middle position as mentioned. The stop 15 forms an extension of one of the lower surfaces 10 of the guideways 6, and prevents the rollers 4 from falling out through the open bottom of the frame in case of tilting of the car. The movement of the followers 11 toward each end of the frame is limited by the shoulders 18 at the ends of the guideways.

For convenience in assembling the parts, the side walls of the frame are provided with slots or seats 19 into which the wear-plate 8 may be slipped from one side, and said plate 8 is held in position by lugs 20 cast integral with the frame and bent down after the plate 8 is in position. There is a plurality of such lugs so that if one is broken off, in removing the plate 8, another lug may be used for holding the next plate 8. The spring sockets are open at their outer ends to permit the insertion of the springs, and the springs are held in by stout pins 21.

The modified construction shown in Figs. 4 and 5 is similar to that shown in the other views, with the exception that it includes a plurality of anti-friction rollers 4 separated by a spacer block 22. Similarly to the formation of the followers 11, the spacer 22 is formed so that it has contact with the trunnions of the rollers without touching the peripheries thereof. In this case there is the same number of wear-plates 8 as there are rollers 4, and these wear-plates are so located that the rollers will not be in contact with them when at either limit of their movement.

The operation of the device shown is as follows: In assembling the bearing, the wear-plates 8 are first secured in place, then the followers are passed one at a time through the passages 7 into the guideways 6, the first follower being pushed to one side so as to allow the second one to be inserted into position. After the followers are in position, the rollers 4 are inserted between the followers, then the block 15 is inserted to close the passages 7 and finally the springs 12 are inserted at the ends of the spring sockets 13 and secured by the keys 21. This device is now ready to be bolted to the body bolster of the car above a suitable bottom plate bolted to the truck bolster, as is usual, this bottom plate being not shown in the drawings and being merely a suitable plate of metal upon which the rollers 4 ride. In case any part becomes worn out, or broken, it can be replaced without disconnecting the frame from the car.

It will be understood that numerous details of the construction shown may be altered or omitted without departing from the spirit of this invention.

I claim:

1. A side bearing comprising a frame having therein a roller runway open at the bottom, a roller mounted in said runway and provided with trunnions, spring pressed followers engaging said trunnions normally urging the roller to a certain position in the frame, a member having a bearing-surface adapted to bear on the periphery of said roller, the range of movement of said roller in said runway being such that it can roll off from said bearing-surface, members having auxiliary bearing-surfaces located adjacent to said trunnions and adapted to support the load when said roller is at one of the limits of its travel in said frame.

2. A side bearing comprising a frame, one or more antifriction rollers supported in said frame and having a limited range of travel therein, a member having a bearing-surface adapted to bear on said roller for supporting the load when the roller is in an intermediate part of its travel, and means for guiding said roller and adapted when said roller is adjacent to the ends of its travel to transfer the load to the axle of the roller and support said roller clear of said bearing-surface.

3. A side bearing comprising a frame, one or more antifriction rollers supported in said frame and having a limited range of travel therein, a member having a bearing-surface adapted to bear on said roller for supporting the load when the roller is in an intermediate part of its travel, means for guiding said roller and adapted when said roller is adjacent to the ends of its travel to transfer the load to the axle of the roller and support said roller clear of said bearing-surface, and means normally urging said roller toward an intermediate position in said frame.

4. A side bearing comprising a frame open at the bottom, an antifriction roller mounted in said frame and having trunnions of less diameter than the periphery of said roller, guideways for said trunnions extending along the opposite sides of said frame, said roller being of sufficient diameter to protrude below said frame when its trunnions are seated in said guideways, means normally urging said roller toward a middle position in said frame a member having a bearing-surface located to engage the top of said roller when in its middle position, said roller being movable beyond one end of said surface, and said guideway being arranged to support and guide said roller when it is clear of said surface.

5. A side bearing comprising a frame, having therein a runway, an antifriction roller mounted to roll in said runway, trunnions on said roller, means engaging said trunnions and normally urging said roller to a certain position intermediate of the ends of said runway, said frame having a bearing surface located to engage the periphery of said roller when said roller is adjacent to said normal intermediate position, said frame having a guiding surface adapted to receive said trunnions and transmit the load to said roller when it is away from said intermediate position.

6. In a side bearing the combination of a supporting frame having a runway therein, an antifriction roller in said runway, trunnions on said roller, and means on said frame adapted to cause the load to be supported by the upper part of the periphery of said roller when the roller is in an intermediate position in said runway and to be supported upon said trunnions when the roller is adjacent to the end of said runway.

7. In a side bearing, the combination of a frame having a runway therein, a series of trunnioned antifriction rollers mounted to travel in said runway, spacing means between said rollers, means normally urging said rollers to a normal position intermediate of the ends of said runway, a series of bearing surfaces, one for each roller, adapted to bear on the peripheries of said rollers when in said normal position and terminating so as to permit said rollers to pass clear of said surfaces when moved in said runway away from said intermediate position, and means on said frame for transmitting the load to the trunnions of said rollers, when the rollers are clear of said bearing surfaces.

8. In a side bearing, the combination of a frame having a runway therein, a series of trunnioned antifriction rollers mounted to travel in said runway, spacing means between said rollers, means normally urging said rollers to a normal position intermediate of the ends of said runway, a series of removable wear-plates, one for each roller, adapted to bear on the peripheries of said rollers when in said normal position and terminating so as to permit said rollers to pass clear of said wear-plates when moved in said runway away from said intermediate position, and means on said frame for transmitting the load to the trunnions of said rollers, when the rollers are clear of said wear-plates.

9. In a side bearing, the combination of a frame having a runway therein, a series of trunnioned antifriction rollers mounted to travel in said runway, movable spacing means between said rollers, followers engaging the trunnions of the end rollers and normally urging said rollers to a normal position intermediate of the ends of said runway, a series of bearing surfaces, one for each roller, adapted to bear on the peripheries of said rollers when in said normal position and terminating so as to permit said rollers to pass clear of said surfaces when moved in said runway away from said intermediate position, and means on said frame for transmitting the load to the trunnions of said rollers, when the rollers are clear of said bearing surfaces.

10. A side bearing comprising a frame having a runway open at the bottom and having guideways in its sides above the bottom, a roller mounted in said runway, and having trunnions extending into said guideways, a pair of spring pressed followers slidably mounted in said runway at respectively opposite ends thereof and each adapted to straddle the roller and abut against both trunnions thereof so as to center the same in said frame, and stops on said frame located in the path of said followers and adapted to limit the movement of said followers toward each other.

Signed at Chicago this 29th day of July, 1909.

ELMYR A. LAUGHLIN.

Witnesses:
W. J. JONES,
L. V. CALHOUN.